US010839249B2

(12) United States Patent
Hoang et al.

(10) Patent No.: US 10,839,249 B2
(45) Date of Patent: Nov. 17, 2020

(54) METHODS AND SYSTEMS FOR ANALYZING IMAGES UTILIZING SCENE GRAPHS

(71) Applicant: INTERNATIONAL BUSINESS MACHINES CORPORATION, Armonk, NY (US)

(72) Inventors: Thanh Lam Hoang, Maynooth (IE); Beat Buesser, Ashtown (IE); Ngoc Minh Tran, Dublin (IE); Charles Jochim, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/296,692

(22) Filed: Mar. 8, 2019

(65) Prior Publication Data
US 2020/0285885 A1  Sep. 10, 2020

(51) Int. Cl.
G06T 9/40 (2006.01)
G06K 9/46 (2006.01)
G06T 17/00 (2006.01)
G06K 9/62 (2006.01)
G06N 20/00 (2019.01)

(52) U.S. Cl.
CPC .......... *G06K 9/469* (2013.01); *G06K 9/6217* (2013.01); *G06N 20/00* (2019.01); *G06T 9/40* (2013.01); *G06T 17/005* (2013.01); *G06T 2210/61* (2013.01)

(58) Field of Classification Search
None
See application file for complete search history.

(56) References Cited

U.S. PATENT DOCUMENTS

| 7,680,353 | B2 | 3/2010 | Jojic et al. |
| 8,295,575 | B2 | 10/2012 | Feldman et al. |
| 2002/0163515 | A1* | 11/2002 | Sowizral ............... G06T 15/40 345/419 |
| 2014/0108915 | A1* | 4/2014 | Lu ....................... G06F 3/04883 715/234 |
| 2015/0325046 | A1 | 11/2015 | Meier |
| 2018/0114096 | A1 | 4/2018 | Sen |

OTHER PUBLICATIONS

"Unsupervised Learning of Object Deformation Models" Iasonas Kokkinos Department of Statistics, UCLA (8 Pages).
ImageHive: An effective interactive visualization method for image collections An IP.com Prior Art Database Technical Disclosure Authors et. al.: Disclosed Anonymously Electronic Publication Date: Jul. 26, 2010 (5 Pages).

(Continued)

Primary Examiner — Said Broome
(74) Attorney, Agent, or Firm — Griffiths & Seaton PLLC

(57) ABSTRACT

Embodiments for analyzing images by one or more processors are described. An image is received. An object appearing in the image is detected. A scene graph is generated for the object. At least one transformational matrix is determined for the object. The at least one transformational matrix is associated with rendering the object as the object appears in the image based on the scene graph.

18 Claims, 8 Drawing Sheets

(56) References Cited

OTHER PUBLICATIONS

"Unsupervised Learning of Categorical Segments in Image Collections" Marco Andreetto et al. Dept. of Electrical Engineering †Dept. of Electrical Engineering, California Institute of Technology Technion—Israel Institute of Technology Pasadena, CA 91125, United States (8 Pages).

Graph R-CNN for Scene Graph Generation, Jianwei Yang et al. Georgia Institute of Technology 2Facebook AI Research, Aug. 2018 (16 Pages).

"Scene Graph Generation from Images" Satoshi Tsutsui and Manish Kumar (12 Pages).

Automatic Object Tracking An IP.com Prior Art Database Technical Disclosure Authors et. al.: Disclosed AnonymouslyIP.com Electronic Publication Date: Sep. 7, 2018 ( 23 Pages).

Image Moderation Using Machine Learning An IP.com Prior Art Database Technical Disclosure Authors et. al.: Disclosed Anonymously IP.com No. IPCOM000252007D IP.com Electronic Publication Date: Dec. 13, 2017 (35 Pages).

\* cited by examiner

METHODS AND SYSTEMS FOR ANALYZING IMAGES UTILIZING SCENE GRAPHS

BACKGROUND OF THE INVENTION

Field of the Invention

The present invention relates in general to computing systems, and more particularly, to various embodiments for analyzing images and/or performing computer vision tasks.

Description of the Related Art

Generally, "computer vision" refers to the use of computers (or computing devices, systems, etc.) to gain an understanding of (e.g., analyze, process, acquire, etc.) images (e.g., digital images), including both still/static images and videos (or video frames). In contrast, "computer graphics" generally refers to creating images and/or videos (e.g., scene rendering) using computers. Thus, in a sense, computer graphics is an inversion (or the opposite) of computer vision.

Recent trends in utilizing deep learning (and/or machine learning, cognitive analysis, etc.) have led to attempts to utilize computer graphics techniques to improve computer vision tasks. For example, as computer graphics is an inversion of computer vision, some attempts have utilized autoencoders to force learning disentangled representation for objects in images. In particular, instead of following a classical encoder-decoder scheme to learn a vector representation of an entire image, some attempts propose adding a graphical rendering engine after the decoder to force the network to learn disentangled representation of the objects. Doing such, may enable systems to learn, in an unsupervised manner, representations of objects with potentially many applications, such as artificial rendering and object detection and/or tracking.

However, such an approach has limits, as an underlying assumption is that objects are essentially "solid" (i.e., have no moving parts), such as is the case with balls, cups, chairs, etc. In contrast, many "real world" objects have many individual parts (e.g., a human body has a head, body/torso, arms, legs, hands, feet, eyes, etc.), which may move together or independently, depending on the other parts to which they are connected. As such, appropriate visual representations of such objects are considerably more complicated.

SUMMARY OF THE INVENTION

Various embodiments for analyzing images by one or more processors are described. In one embodiment, by way of example only, a method for analyzing images, again by one or more processors, is provided. An image is received. An object appearing in the image is detected. A scene graph is generated for the object. At least one transformational matrix is determined for the object. The at least one transformational matrix associated with rendering the object as the object appears in the image based on the scene graph.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
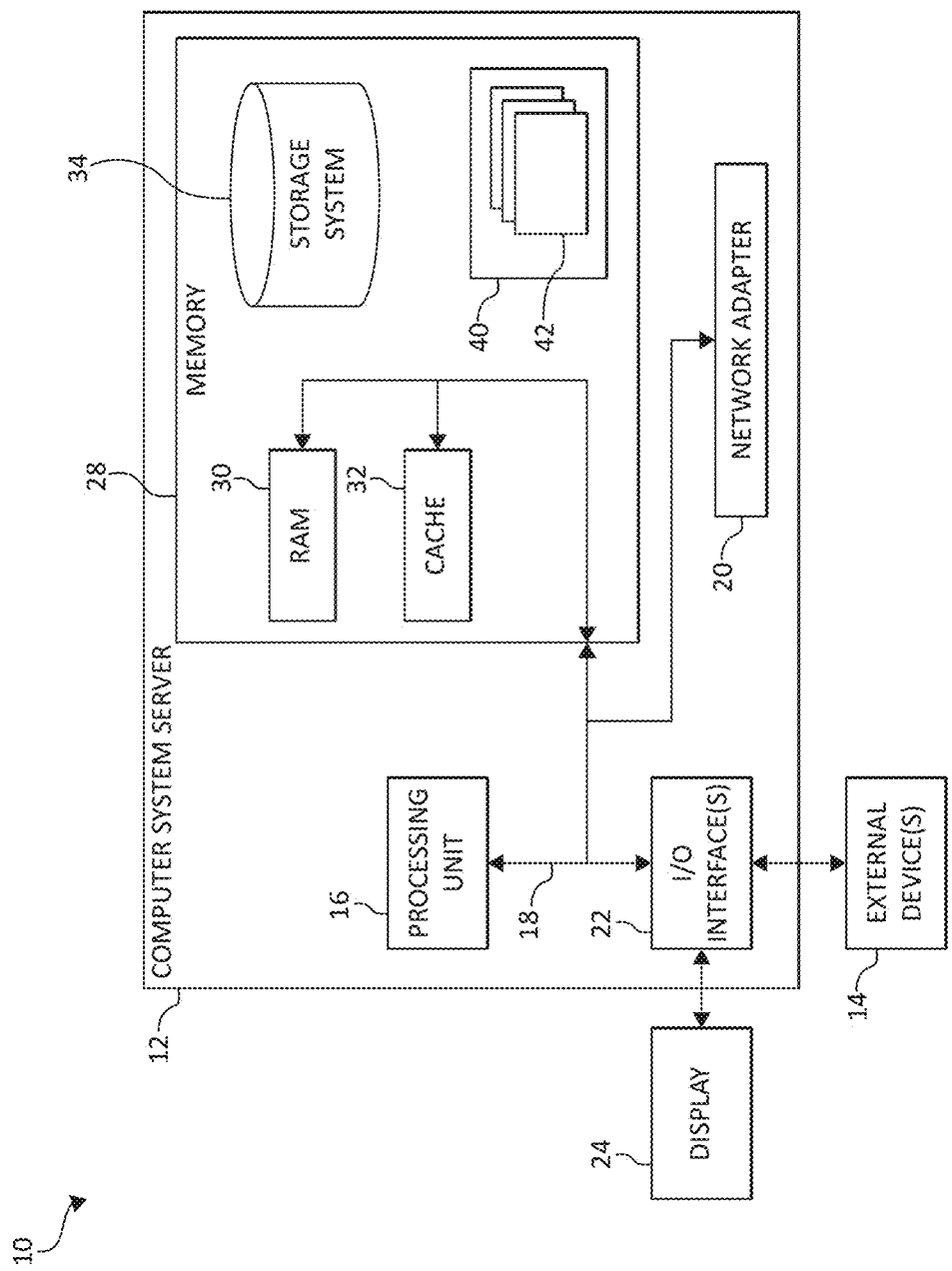
FIG. 1 is a block diagram depicting an exemplary computing node according to an embodiment of the present invention.

As discussed above, generally, "computer vision" may be considered, at least in a sense, to be an inversion (or the opposite) of "computer graphics." More specifically, computer vision refers to the use of computers (or computing devices, systems, etc.) to gain an understanding of (e.g., analyze, process, etc.) images (e.g., digital images), including both still/static images and videos (or video frames). In contrast, "computer graphics" generally refers to creating images and/or videos (e.g., scene rendering) using computers.

In recent years, attempts have been made to utilize deep learning (and/or machine learning, cognitive analysis, etc.) and computer graphics techniques to improve computer vision tasks. For example, since computer graphics is an inversion of computer vision, some attempts have utilized autoencoders to force learning disentangled representation for objects in images. In particular, instead of following a classical encoder-decoder scheme to learn a vector representation of the entire image, some attempts propose to add a graphical rendering engine after the decoder to force the network to learn disentangled representation of the objects. Doing such, may enable systems to learn, in an unsupervised manner, representations of objects with potentially many applications, such as artificial rendering and object detection and/or tracking.

However, such approaches have limits, as an underlying assumption is that objects are essentially "solid" (i.e., have no moving parts), such as balls, cups, chairs, etc. In contrast, many objects have many individual parts (e.g., a human body has a head, body/torso, arms, legs, hands, feet, eyes, etc.), which may move together or independently, depending on the other parts to which they are connected. As such, appropriate visual representations of such objects are considerably more complicated.

To address these needs, in some embodiments described herein, methods and/or systems are disclosed that learn, for example, three-dimensional (3D) representations of objects in an unsupervised manner, utilizing scene graphs. In other words, some embodiments described herein utilize scene graphs for computer vision techniques or tasks.

As will be appreciated by one skilled in the art, in computer graphics, scene graphs (or graphical scene graphs) are general data structures that arrange the logical and/or spatial representations of graphical scenes and/or the objects within graphical scenes. Scene graphs are often a collection of nodes in a graph or "tree" structure, where each node represents, for example, a part of an object. A tree node may have many children but only a single parent, with the effect of a parent applied to all of its child nodes.

An operation performed on a group automatically propagates its effect to all of its members. In many instances, associating a geometrical transformation (or transformational) matrix at each group level and concatenating such matrices together is an efficient and natural way to process such operations. A root (or world) node may represent the entire object and keep transformational matrices that transform the entire object from local coordinate system to world coordinate system and render the object in a camera space. A common feature is the ability to group related shapes and objects into a compound object that can then be moved, transformed, selected, etc. as easily as a single object. Scene graphs are considered to be an efficient representation of objects, irrespective of pose and view (i.e., camera view, the angle from which the object(s) is viewed, etc.).

Using graphical representations of objects in the form of, for example, scene graphs, computer graphics may render or generate images by applying transformational matrices (e.g., rotation, scaling, translation, projection, etc.). In contrast, computer vision typically receives an image as input, and may perform various tasks, such as object detection, localization, and/or tracking and scene classification, using, for example, neural networks (or machine learning, cognitive analyses, etc.) or classical computer vision (e.g., object detection).

As mentioned above, attempts have recently been made to utilize autoencoders for computer vision tasks. Generally, autoencoders are (or utilize) artificial neural network used to learn efficient data codings in an unsupervised manner. The general goal of an autoencoder is to learn a representation (or encoding) for a set of data, typically for dimensionality reduction, by training the network to ignore signal "noise." Along with the reduction side, a reconstructing side (or "decoding") is learned, where the autoencoder attempts to generate a representation as close as possible to the original input based on the reduced encoding.

With respect to the recent attempts in computer vision, a classical autoencoder receives an image as input. The encoder generates a single embedding vector, from which the decoder then tries to reconstruct the original image. Such an approach is not efficient for applications such as object tracking and video generation because the embedding vector does not represent separate objects in the image.

Some recent developments have attempted to utilize a graphical rendering engine after the decoder (i.e., receiving input from the decoder) to force the network to learn disentangled representation of the objects in the images. In such instances, the encoder generates intermediate representations of each of the objects, which must be actual visual representations (i.e., as the objects appear in the image). The decoder generates transformational matrices for the intermediate representations, which are then used by the computer graphics rendering engine to reconstruct the original image. Such a system may be "trained" to optimize performance and/or minimize errors. However, as mentioned above, some objects include multiple portions or parts, which may move independently and/or relative to each other. Additionally, some objects appear different when the parts move and/or when viewed from different angles. As such, it is not effective to encode objects (e.g., multiple instances of the same object appearing in a single image) as separate representations.

In some embodiments described herein, an autoencoder is utilized, which includes an encoder, a decoder, and a scene graph renderer (or render or rendering engine). The encoder receives an image (i.e., the original or a first image) that has at least one object (i.e., at least one object appearing in the image). The encoder generates a scene graph for each "type" of object in the image. For example, if the image includes multiple birds and a tree, one scene graph may be generated for all of the birds and one scene graph may be generated for the tree. The scene graph rendering engine may be configured to render as many instances of the objects (i.e., in different poses, from different angles, etc.) as possible. Such a result may be possible because of the nature of scene graphs, as described above (i.e., scene graphs are efficient representations of object regardless of pose, viewing angle, etc.).

In some embodiments, the decoder receives the scene graph(s) as input and generates (or determines) at least one transformational matrix associated with rendering the object(s) as they appear in the original image. The scene graph rendering engine receives the transformational matrix (or matrices) and the scene graph(s), and in some embodiments, renders the results as an output (or second) image. The methods and/or systems described herein may (also) be applied to and/or utilized in, for example, object detection, localization, and tracking, as well as scene (or image) classification, other visual recognition services, and video generation.

In some embodiments, the system (and/or the autoencoder), or at least particular aspects of operation thereof, is trained via an unsupervised learning. As will be appreciated by one skilled in the art, unsupervised learning is a branch of machine learning (or cognitive analysis) that learns from test data that has not been labeled, classified, or categorized. That is, instead of responding to feedback, unsupervised learning identifies commonalities in the data and reacts based on the presence or absence of such commonalities in each new piece of data.

With respect to the embodiments described herein, the autoencoder may be trained to reconstruct (or replicate, render, etc.) images by rendering the learned scene graphs of objects appearing in images (e.g., via unsupervised learning). The autoencoder may also be trained (e.g., via unsupervised learning) to learn appropriate scene graph structures for various types of objects, 3D representations of objects (or parts of objects), and the relationship between object parts (e.g., an arm or wing) and their parents (e.g., a human or bird torso). Further, the system (and/or the autoencoder) may learn transformational matrices that are ideal to render all of the objects in an image to optimize the accuracy and/or minimize the errors in reconstructed images.

As such, in some embodiments, the methods and/or systems described herein may utilize a "neural network," "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the analysis of images as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for analyzing images (and/or performing one or more computer vision task), again by one or more processors, is provided. An image is received. An object appearing in the image is detected. A scene graph is generated for the object. At least one transformational matrix is determined for the object. The at least one transformational matrix is associated with rendering the object as the object appears in the image based on the scene graph.

A second image may be generated utilizing the scene graph and the at least one transformational matrix. The generating of the scene graph, the determining of the at least one transformational matrix, and the generating of the second image may be performed utilizing an autoencoder.

The autoencoder may include an encoder, a decoder, and a rendering engine. The encoder may be configured to generate the scene graph for the object. The decoder may be configured to determine the at least one transformational matrix based on the scene graph. The rendering engine may be configured to generate the second image based on the scene graph and the at least one transformational matrix. The autoencoder may be trained utilizing an unsupervised learning method.

A second object appearing in the image may be detected. The (first) object may be of a first object type, and the second object may be of a second object type. A second scene graph may be generated for the second object. At least one second transformational matrix may be determined for the second object. The at least one second transformational matrix may be associated with rendering the second object as the second object appears in the image based on the second scene graph.

The (first) object and the second object may be of the same object type. The at least one transformational matrix may be further associated with rendering the second object as the second object appears in the image based on the scene graph. A third object appearing in the image may be detected. The (first) object and the second object may be of a first object type, and the third object may be of a second object type. A second scene graph may be generated for the third object. At least one second transformational matrix may be determined for the third object. The at least one second transformational matrix may be associated with rendering the third object as the third object appears in the image based on the second scene graph.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
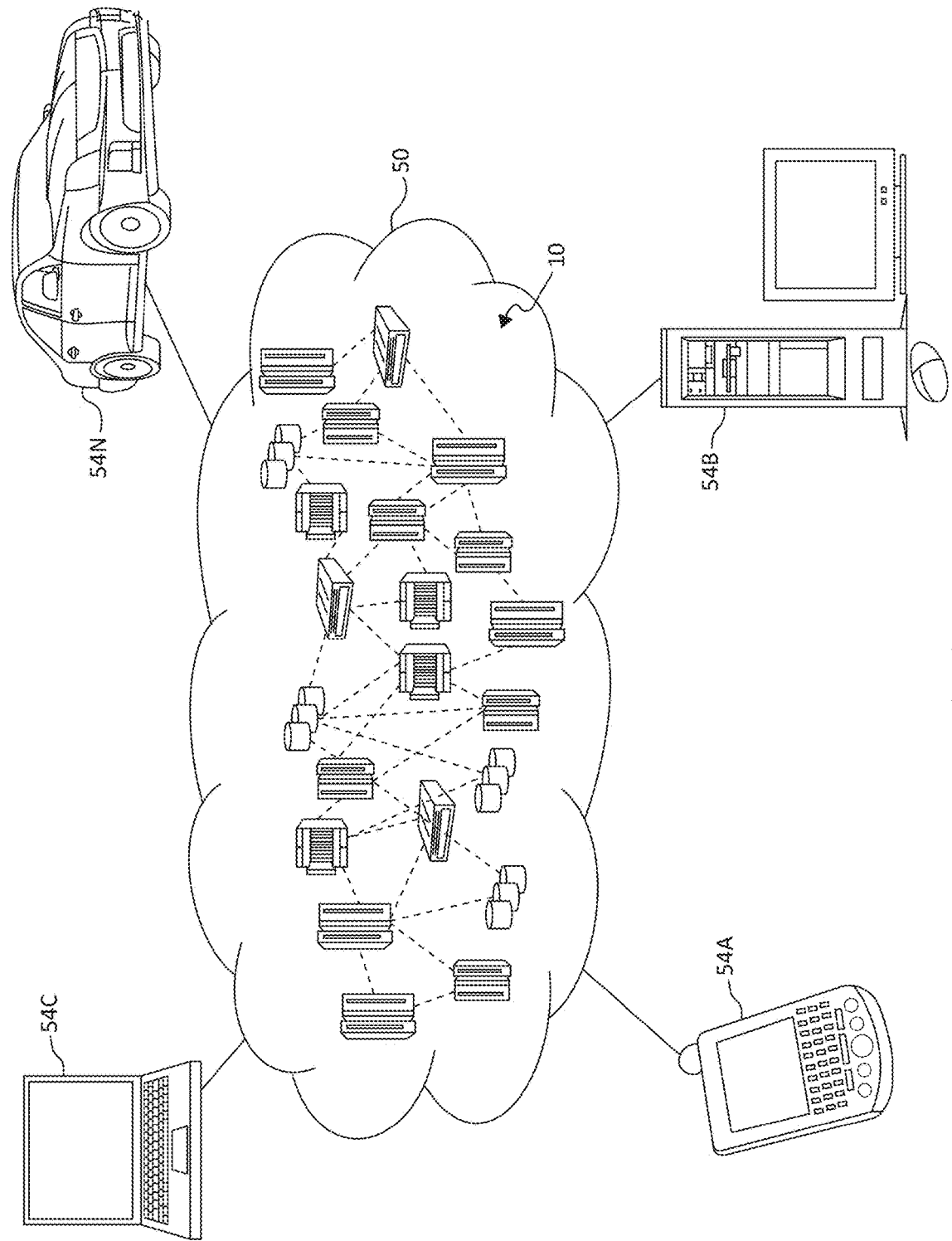
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
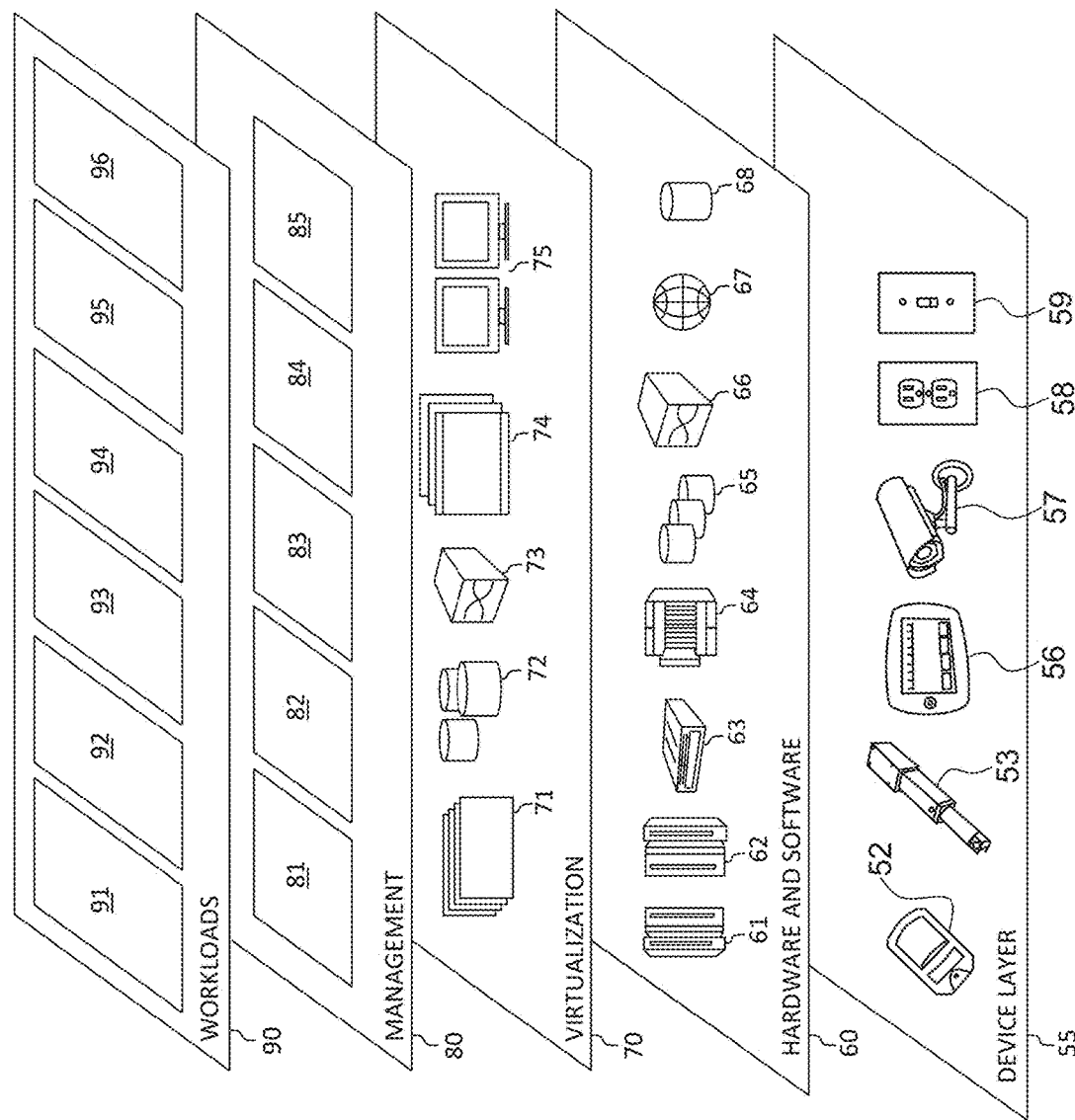
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for analyzing images and/or performing computer vision tasks as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide methods and systems for analyzing (or processing) images and/or performing computer vision tasks. In some embodiments described herein, an autoencoder is utilized, which includes an encoder, a decoder, and a scene graph renderer (or rendering engine). The encoder receives an image (i.e., the original or a first image) that has at least one object (i.e., at least one object appearing in the image). The encoder generates a scene graph for each "type" of object in the image. The scene graph rendering engine may be configured to render as many instances of the objects (i.e., in different poses, from different angles, etc.) as possible. Such a result is possible because of the nature of scene graphs, as described above (i.e., scene graphs are efficient representations of object regardless of pose, viewing angle, etc.).

In some embodiments, the decoder receives the scene graph(s) as input and generates (or determines) at least one transformational matrix associated with rendering the object(s) as they appear in the original image. The scene graph rendering engine receives the transformational matrix (or matrices) and the scene graph(s), and in some embodiments, renders the results as an output (or second) image. The methods and/or systems described herein may (also) be applied to and/or utilized in, for example, object detection, localization, and tracking, as well as scene (or image) classification, other visual recognition services, and video generation.

Figure 4:
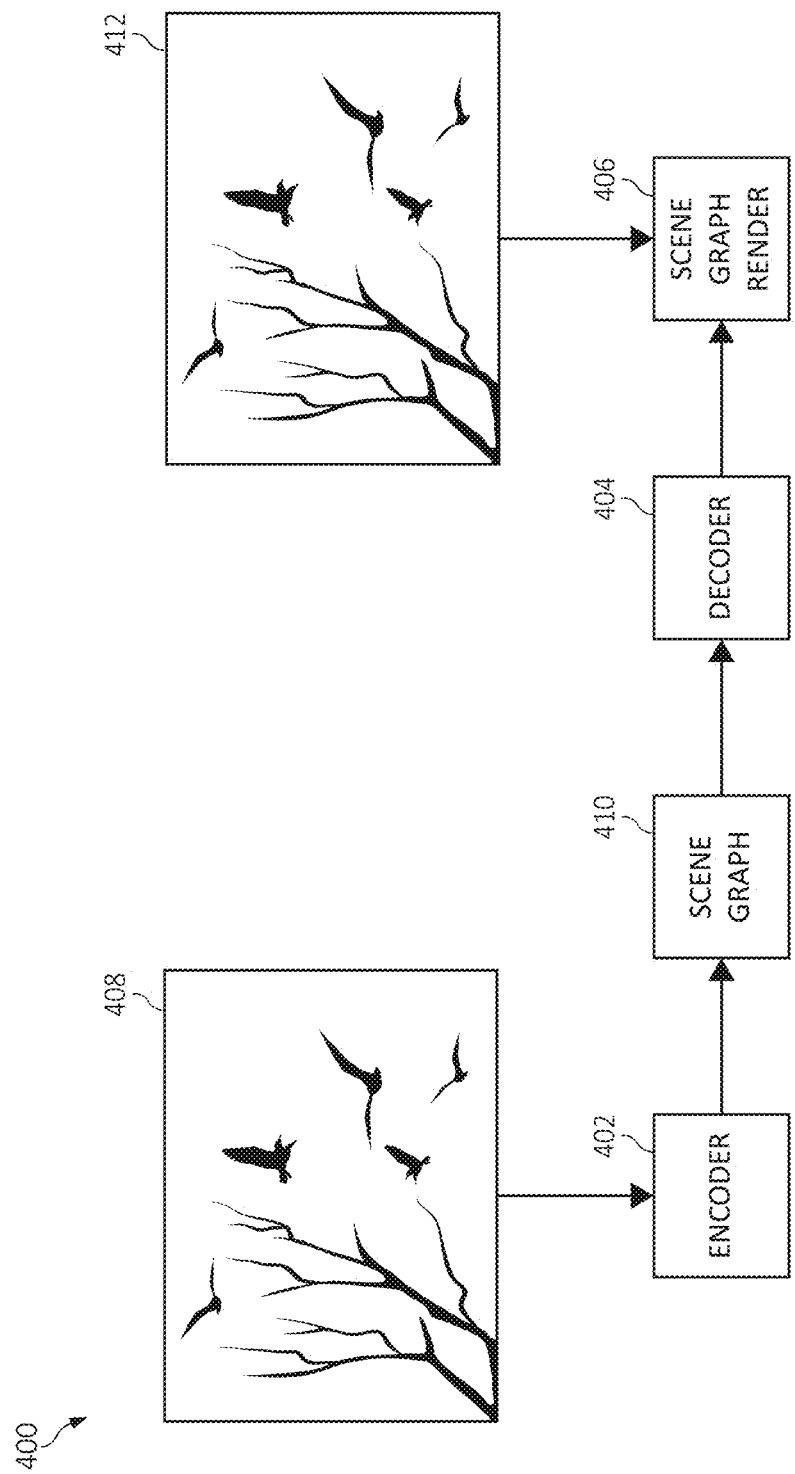
FIG. 4 is a block diagram/flow chart of a system and/or method for analyzing images according to an embodiment of the present invention.

FIG. 4 is a simplified block diagram/flow chart of a system (and/or method) 400 according to some embodiments described herein. The system 400 may include (and/or be similar to an autoencoder), and thus have an encoder 402 and a decoder 404. In the depicted embodiment, the system 400 also includes a scene graph render (or rendering engine) 406.

As described above, in some embodiments, the encoder 402 receives a first (or original) image 408. In the depicted embodiment, the first image 408 includes, or has appearing therein, several (e.g., at least four) birds (perhaps along with other objects not mentioned here for sake of simplicity). In accordance with some aspects of the present invention, the encoder generates a scene graph for each type of object appearing in the image. More particularly, if the first image is determined to include two types of objects, then two scene graphs (i.e., one for each type of object) is generated. As such, in the depicted embodiment, the encoder 402 may generate a single scene graph 410 (i.e., one scene graph for the four birds appearing in the first image 408).

As shown, the decoder 404 receives the scene graph 410 as input and generates (or determines) at least one transformational matrix associated with rendering the object(s) associated with and/or represented by the scene graph 410 as it (or they) appear in the first image 408. The scene graph rendering engine 406 receives the transformational matrix (or matrices) and the scene graph 410, and in some embodiments, renders the results as a second (or output) image 412, as will be appreciated by one skilled in the art.

Figure 5:
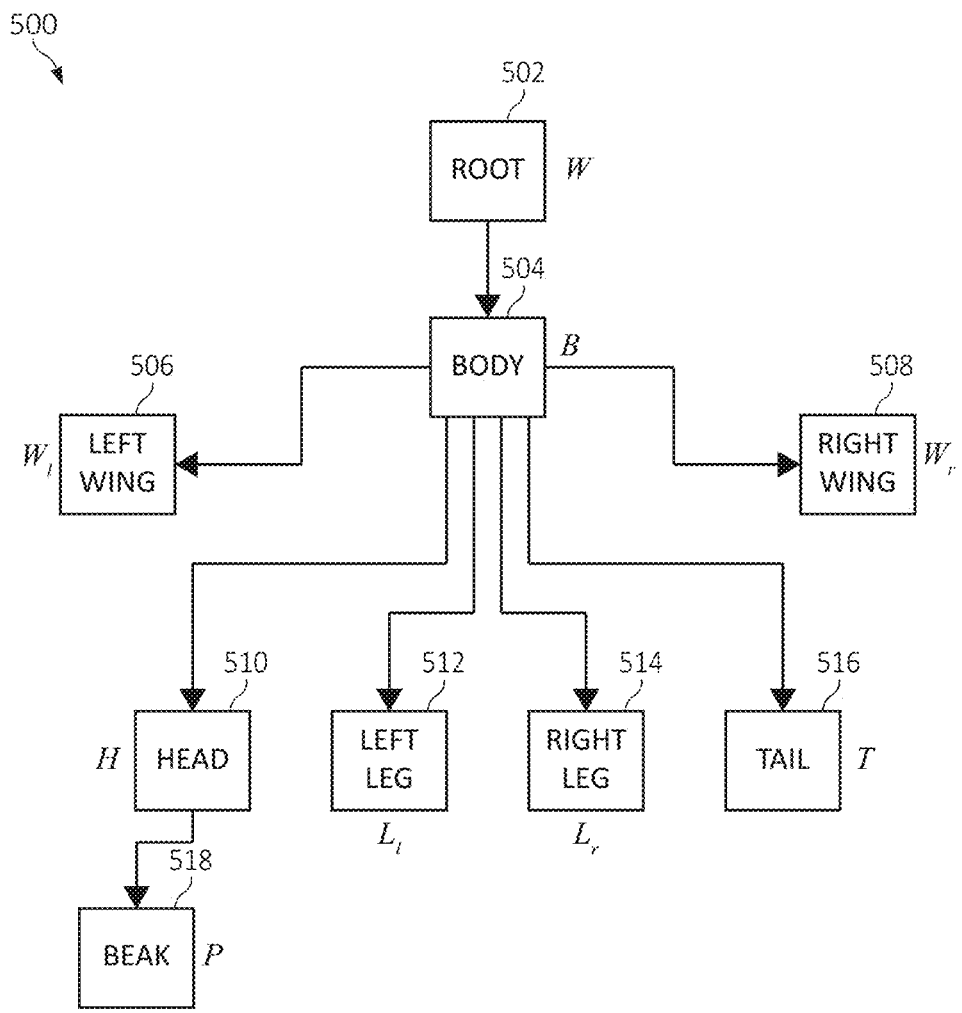
FIG. 5 is a block diagram of an exemplary scene graph according to an embodiment of the present invention.

FIG. 5 illustrates an exemplary scene graph 500 according to some embodiments described herein. In particular, the scene graph 500 shown in FIG. 5 may be considered to be a scene graph generated by the encoder 402 in FIG. 4 as a representation of the birds appearing in the first image 408. Referring again to FIG. 5, as will be appreciated by one skilled in the art, the scene graph 500 includes (and/or is made of) nodes 502-518, each of which is shown with exemplary coordinates/transformational parameters (i.e., in italics, such as W/). In particular, the nodes include a root (or world) node 502, a body node 504, a left wing node 506, a right wing node 508, a head node 510, a left leg node 512, a right leg node 514, a tail node 516, and a beak node 518. Nodes 506-516 are direct child nodes of body node 504, and beak node 518 is a child node of head node 510. In some embodiments, the encoder performs one or more object detection process on the input image to identify objects and/or parts of objects, which may utilize, for example, a region-based convolutional neural network (R-CNN). The encoder may then generate the scene graph(s). This process may be tuned utilizing the unsupervised learning techniques described herein.

As described above, the scene graph rendering engine may be configured to render as many instances of the objects, or more particularly, the bird(s) (i.e., in different poses, from different angles, etc.) that appear in the original image (i.e., the first image 408 in FIG. 4). Such a result is possible because of the nature of scene graphs, as described above (i.e., scene graphs are efficient representations of object regardless of pose, viewing angle, etc.). As such, in some embodiments, the scene graph rendering engine 406 may be considered to operate in a manner similar to such an engine utilized in some computer graphics tasks, as will be appreciated by one skilled in the art.

Figure 6:
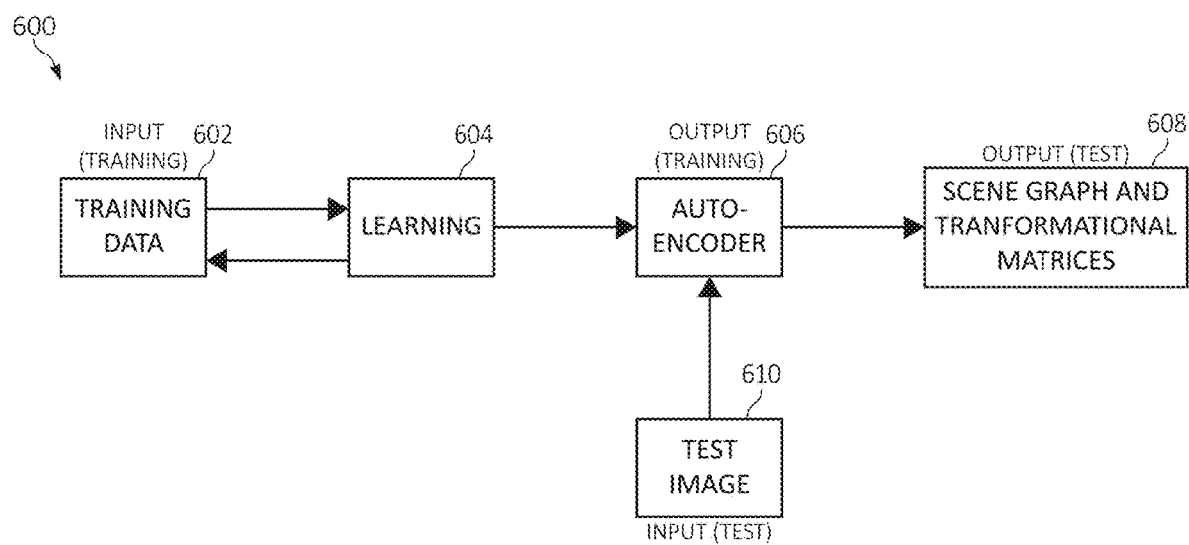
FIG. 6 a block diagram/flow chart illustrating some aspects of functionality according to an embodiment of the present invention.

FIG. 6 is a block diagram/flow chart of a system (and/or method) 600, illustrating some aspects of functionality of the embodiments described herein. In particular, the embodiment shown in FIG. 6 depicts training and/or testing of a system for analyzing images described herein. Shown in FIG. 6 are training data 602, a learning module 604, and an autoencoder 606. The training data 602 may include training images, which are received (or detected) by the learning module 604. Although the learning module 604 is shown as a separate component in FIG. 6, it may be integrated within the autoencoder 606 and include a neural network. The autoencoder 606 (and/or the learning module 604) generates (at least one) scene graph and one or more transformational matrix as output 608. The scene graph(s) and transformational matrices may then be used to (attempt to) reconstruct the original image (i.e., from the training data 602), which may be performed by a rendering engine as described above. The reconstructed image may then me compared to the original image (e.g., by the learning module 604). A test image (or multiple test images) 610 may then be received by the autoencoder 606, which may then generate appropriate scene graph(s) and transformational matrices. The resulting output image may then be compared to the test image 610. In some embodiments, training may be performed utilizing, for example, back-propagation algorithms to minimize reconstruction error between input images and output images ($|I-I_0|$).

Figure 7:
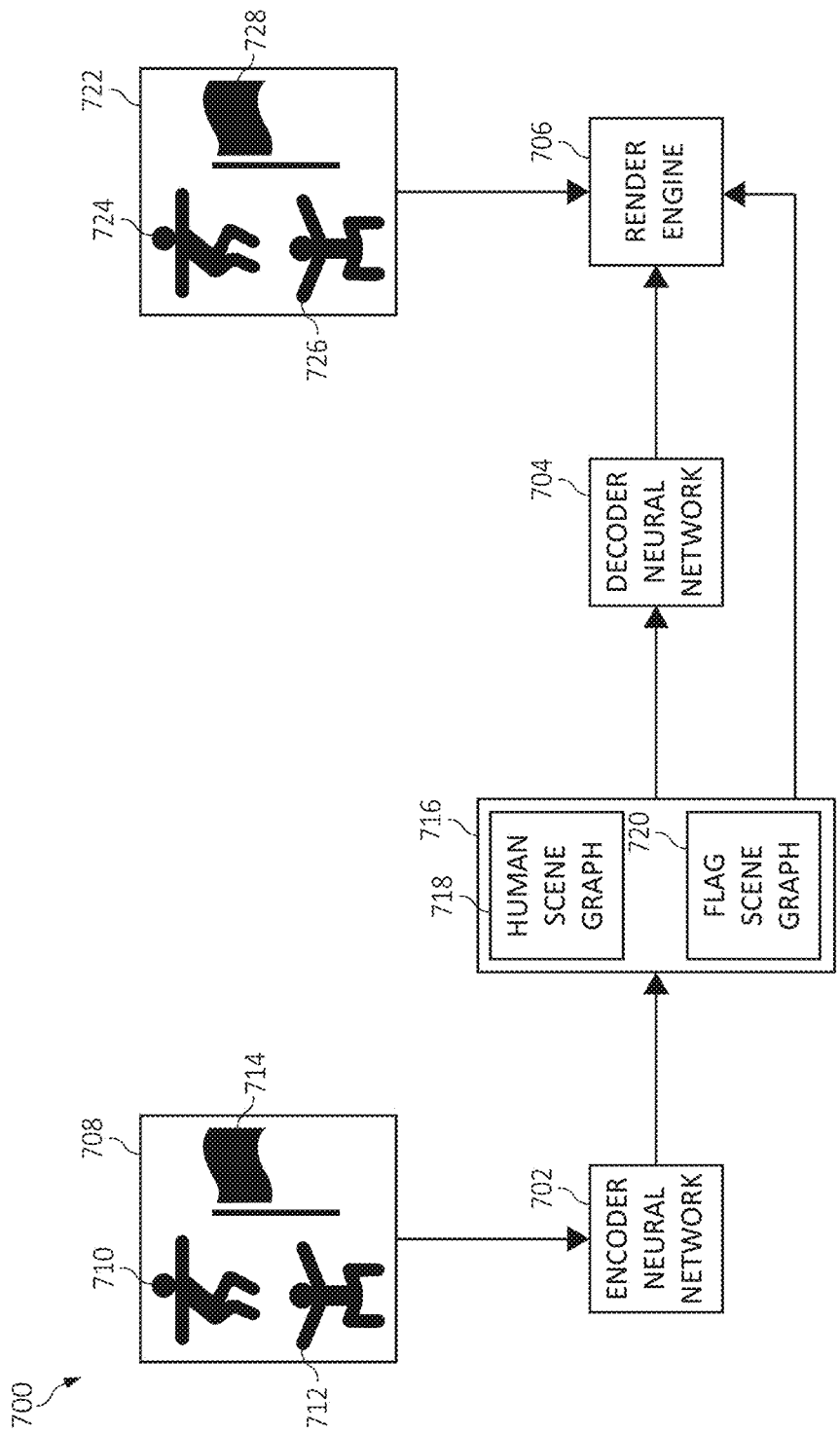
FIG. 7 is a block diagram/flow chart of a system and/or method for analyzing images according to an embodiment of the present invention.

FIG. 7 is a simplified block diagram/flow chart of a system (and/or method) 700 according to some embodiments described herein. The system 700 may include (and/or be similar to an autoencoder), and thus have an encoder (or encoder neural network) 702 and a decoder (or decoder neural network) 704. In the depicted embodiment, the system 700 also includes a render engine (or scene graph rendering engine) 706.

As described above, in some embodiments, the encoder 702 receives a first (or original) image 708 (I). In the depicted embodiment, the first image 708 includes, or has appearing therein, a first human (or individual, person, etc.) 710, a second human 712, and a flag (or flagpole) 714. It should be noted that the first human 710 and the second human 712 in the first image 708 are not identical (i.e., they are standing/appearing in different poses/postures).

In a manner similar to that described above, the encoder 702 generates intermediate representations (or scene graphs) 716 for the objects detected in the first image 708. In particular, the encoder generates a scene graph for each type of object detected in the first image 708. As such, in the embodiment depicted in FIG. 7, the encoder 702 generates a human scene graph 718 and a flag scene graph 720. It should be noted that although two humans 710 and 712 appear in the first image 708, only one scene graph associated with the humans 710 and 712 is generated.

As described above, the scene graphs 718 and 720 are received by the decoder 704, which generates (or determines) at least one transformational matrix associated with rendering the object(s) associated with and/or represented by the scene graphs 718 and 720 as they appear in the first image 708. The render engine 706 receives the transformational matrix (or matrices) and the scene graphs 718 and 720 and generates a second (or output) image 722 ($I_O$). As shown, like the first image 708, the second image 722, includes a first human 724, a second human 726, and a flag 728. As such, the render engine 706 utilizes the single human scene graph 718 (and the appropriate transformational matrices) to render two instances of a human object, each being in a pose similar to the appropriate counterpart human 710 or 712 appearing in the first image 708. As described above, the system 700 may compare the second image 722 (and/or the objects appearing therein) to the first image 708 to improve performance using, for example, unsupervised learning and/or back-propagation algorithms to minimize reconstruction error.

As such, in some embodiments, when the system receives (or detects) an image, the system may output (or generate) visual representations of objects in the image. In at least some embodiments, the representations are in the form of (or include) scene graphs. The system may also generate (or determine) how the objects were "transformed" into the given poses, postures, viewing angles, etc. shown in the image (e.g., via transformational matrices).

In some embodiments, the system is trained using unsupervised learning methods and an autoencoder is utilized. The autoencoder may include an encoder and a decoder. The encoder may receive the image as input and generate the representations (or intermediate representations or scene graphs). The decoder may receive the representations and generate transformational matrices to reconstruct the image using the representations. A render engine (e.g., integrated within the decoder) may then reconstruct the image. Because of the use of the unsupervised learning method(s), the autoencoder may be trained without the need to label the images and/or objects within the images. As discussed above, this is in contrast to a conventional or classical autoencoder, in which the intermediate representation(s) generated is in the form of a vector that compresses the entire image.

In some embodiments described herein, because the decoder is constrained to computer graphic renders (or rendering), the encoder is "forced" to learn objects' graphic representations (2D or 3D) in the form of scene graphs, rather than embedded vector representations, which are relatively difficult to interpret. Also, the intermediate objects' graphic representations (e.g., scene graphs and transformational matrices) include a substantial amount of information about the objects, such as poses, perspective, and relative positions, as well as 3D representations.

In some embodiments described herein, after a training phase (or multiple training phases), an input image (or video, video frame(s), etc.) may be received (e.g., during testing or use), and the system may be used to determine what objects appear in the image, how the objects are transformed (e.g., translation, rotation, scaling, etc. when multiple instances of the same type of object appear in the image and/or how the object(s) change from one image to another) in the image. The information may be utilized in various ways and/or for various applications, such as transfer learning (i.e., learned representations may be transferred to other supervises tasks) for visual recognition services, object detection, object tracking, action recognition (e.g., people exercising, dancing, playing sports, etc.), video synthesis (i.e., once the 3D representation of an object is learned, animated videos of that object may be generated), 3D printing, virtual and/or augmented reality.

Figure 8:
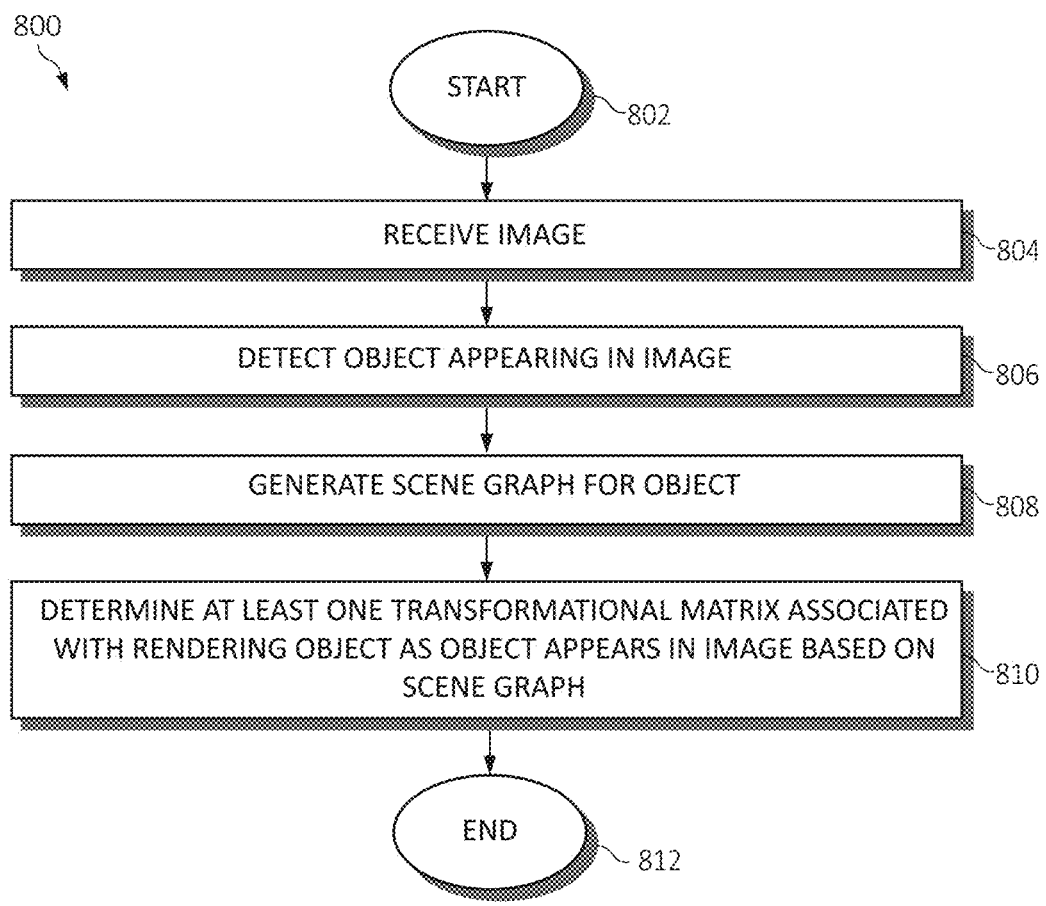
FIG. 8 is a flowchart diagram of an exemplary method for analyzing images according to an embodiment of the present invention.

Turning to FIG. 8, a flowchart diagram of an exemplary method 800 for analyzing images (and/or performing a computer vision task), again by one or more processors, is provided. The method 800 begins (step 802) with, for example, an image being selected for analysis. The image may be digital image, such as a still digital image or a video frame.

The image is received (step 804), for example, by an encoder within an autoencoder, as described above. An object appearing in the image is detected (step 806). In some embodiments, the image includes more than one object and/or more than one type of object. A scene graph is generated for the object (step 808), as described above.

At least one transformational matrix is determined for the object (step 810). The at least one transformational matrix is associated with rendering the object as the object appears in the image based on the scene graph.

A second image may be generated utilizing the scene graph and the at least one transformational matrix. The generating of the scene graph, the determining of the at least one transformational matrix, and the generating of the second image may be performed utilizing an autoencoder. The autoencoder may include an encoder, a decoder, and a rendering engine. The encoder may be configured to generate the scene graph for the object. The decoder may be configured to determine the transformational matrix based on the scene graph. The rendering engine may be configured to generate the second image based on the scene graph and the transformational matrix. The autoencoder may be trained utilizing an unsupervised learning method.

A second object appearing in the image may be detected. The (first) object may be of a first object type, and the second object may be of a second object type. A second scene graph may be generated for the second object. At least one second transformational matrix may be determined for the second object. The at least one second transformational matrix may be associated with rendering the second object as the second object appears in the image based on the second scene graph.

The (first) object and the second object may be of the same object type. The at least one transformational matrix may be further associated with rendering the second object as the second object appears in the image based on the scene graph. A third object appearing in the image may be detected. The (first) object and the second object may be of a first object type, and the third object may be of a second object type. A second scene graph may be generated for the third object. At least one second transformational matrix may be determined for the third object. The at least one second transformational matrix may be associated with rendering the third object as the third object appears in the image based on the second scene graph.

Method 800 ends (step 812) with, for example, the scene graph(s), the transformational matrix (or matrices), and/or any generated images being utilized for image analysis and/or computer vision task, as described above. Further, unsupervised learning may be utilized to improve the operation/performance of the system. In some embodiments, feedback from users may also be utilized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for analyzing images comprising:
 receiving an image;
 detecting an object appearing in the image;
 generating a scene graph for the object;
 determining at least one transformational matrix for the object, wherein the at least one transformational matrix is associated with rendering the object as the object appears in the image based on the scene graph; and
 generating a second image utilizing the scene graph and the at least one transformational matrix.

2. The method of claim 1, wherein the generating of the scene graph, the determining of the at least one transformational matrix, and the generating of the second image are performed utilizing an autoencoder, and the autoencoder includes an encoder, a decoder, and a rendering engine, and wherein the encoder is configured to generate the scene graph for the object, the decoder is configured to determine the at least one transformational matrix based on the scene graph, and the rendering engine is configured to generate the second image based on the scene graph and the at least one transformational matrix.

3. The method of claim 1, wherein the generating of the scene graph, the determining of the at least one transformational matrix, and the generating of the second image are performed utilizing an autoencoder, and further comprising training the autoencoder utilizing an unsupervised learning method.

4. The method of claim 1, further comprising:
 detecting a second object appearing in the image, wherein the object is of a first object type and the second object is of a second object type;
 generating a second scene graph for the second object; and
 determining at least one second transformational matrix for the second object, wherein the at least one second transformational matrix is associated with rendering the second object as the second object appears in the image based on the second scene graph.

5. The method of claim 1, further comprising detecting a second object appearing in the image, wherein the object and the second object are of the same object type, and wherein the at least one transformational matrix is further associated with rendering the second object as the second object appears in the image based on the scene graph.

6. The method of claim 5, further comprising:
 detecting a third object appearing in the image, wherein the object and the second object are of a first object type and the third object is of a second object type;
 generating a second scene graph for the third object; and
 determining at least one second transformational matrix for the third object, wherein the at least one second transformational matrix is associated with rendering the third object as the third object appears in the image based on the second scene graph.

7. A system for analyzing images comprising:
 at least one processor that
  receives an image;
  detects an object appearing in the image;
  generates a scene graph for the object;
  determines at least one transformational matrix for the object, wherein the at least one transformational matrix is associated with rendering the object as the object appears in the image based on the scene graph; and
  generates a second image utilizing the scene graph and the at least one transformational matrix.

8. The system of claim 7, wherein the generating of the scene graph, the determining of the at least one transformational matrix, and the generating of the second image are performed utilizing an autoencoder, and the autoencoder includes an encoder, a decoder, and a rendering engine, and wherein the encoder is configured to generate the scene graph for the object, the decoder is configured to determine the at least one transformational matrix based on the scene graph, and the rendering engine is configured to generate the second image based on the scene graph and the at least one transformational matrix.

9. The system of claim 7, wherein the generating of the scene graph, the determining of the at least one transformational matrix, and the generating of the second image are performed utilizing an autoencoder, and wherein the at least one processor further trains the autoencoder utilizing an unsupervised learning method.

10. The system of claim 7, wherein the at least one processor further:
 detects a second object appearing in the image, wherein the object is of a first object type and the second object is of a second object type;
 generates a second scene graph for the second object; and
 determines at least one second transformational matrix for the second object, wherein the at least one second transformational matrix is associated with rendering the second object as the second object appears in the image based on the second scene graph.

11. The system of claim 7, wherein the at least one processor further detects a second object appearing in the image, wherein the object and the second object are of the same object type, and wherein the at least one transformational matrix is further associated with rendering the second object as the second object appears in the image based on the scene graph.

12. The system of claim 11, wherein the at least one processor further:
 detects a third object appearing in the image, wherein the object and the second object are of a first object type and the third object is of a second object type;
 generates a second scene graph for the third object; and
 determines at least one second transformational matrix for the third object, wherein the at least one second transformational matrix is associated with rendering the third object as the third object appears in the image based on the second scene graph.

13. A computer program product for analyzing images by one or more processors, the computer program product comprising a non-transitory computer-readable storage medium having computer-readable program code portions stored therein, the computer-readable program code portions comprising:
 an executable portion that receives an image;
 an executable portion that detects an object appearing in the image;
 an executable portion that generates a scene graph for the object;
 an executable portion that determines at least one transformational matrix for the object, wherein the at least one transformational matrix is associated with rendering the object as the object appears in the image based on the scene graph; and an executable portion that generates a second image utilizing the scene graph and the at least one transformational matrix.

14. The computer program product of claim 13, wherein the generating of the scene graph, the determining of the at least one transformational matrix, and the generating of the second image are performed utilizing an autoencoder, and the autoencoder includes an encoder, a decoder, and a rendering engine, and wherein the encoder is configured to generate the scene graph for the object, the decoder is configured to determine the at least one transformational matrix based on the scene graph, and the rendering engine is configured to generate the second image based on the scene graph and the at least one transformational matrix.

15. The computer program product of claim 13, wherein the generating of the scene graph, the determining of the at least one transformational matrix, and the generating of the second image are performed utilizing an autoencoder, and further comprising training the autoencoder utilizing an unsupervised learning method.

16. The computer program product of claim 13, wherein the computer-readable program code portions further include:
an executable portion that detects a second object appearing in the image, wherein the object is of a first object type and the second object is of a second object type;
an executable portion that generates a second scene graph for the second object; and
an executable portion that determines at least one second transformational matrix for the second object, wherein the at least one second transformational matrix is associated with rendering the second object as the second object appears in the image based on the second scene graph.

17. The computer program product of claim 13, wherein the computer-readable program code portions further include an executable portion that detects a second object appearing in the image, wherein the object and the second object are of the same object type, and wherein the at least one transformational matrix is further associated with rendering the second object as the second object appears in the image based on the scene graph.

18. The computer program product of claim 17, wherein the computer-readable program code portions further include:
an executable portion that detects a third object appearing in the image, wherein the object and the second object are of a first object type and the third object is of a second object type;
an executable portion that generates a second scene graph for the third object; and
an executable portion that determines at least one second transformational matrix for the third object, wherein the at least one second transformational matrix is associated with rendering the third object as the third object appears in the image based on the second scene graph.

* * * * *